United States Patent [19]

Torii et al.

[11] Patent Number: 4,606,750
[45] Date of Patent: Aug. 19, 1986

[54] MOLD FOR DIRECT PRESS MOLDING OF OPTICAL GLASS ELEMENT

[75] Inventors: Hideo Torii, Higashiosaka; Masaki Aoki, Minou; Hideyuki Okinaka, Toyonaka; Satoru Yuhaku, Osaka; Shoji Nakamura, Hirakata, all of Japan

[73] Assignee: Matsushita Electric Industrial Co., Ltd., Osaka, Japan

[21] Appl. No.: 679,292

[22] Filed: Dec. 7, 1984

[30] Foreign Application Priority Data

Dec. 9, 1983 [JP] Japan ................................ 58-231257

[51] Int. Cl.[4] ........................... C03C 9/34; B26B 7/34
[52] U.S. Cl. ............................. 65/374.13; 65/374.15; 249/134
[58] Field of Search ............ 65/374.1, 374.13, 374.15; 249/134; 423/345

[56] References Cited

U.S. PATENT DOCUMENTS

| | | | |
|---|---|---|---|
| 1,378,189 | 5/1921 | Northrup | 423/345 X |
| 3,286,312 | 11/1966 | Davis et al. | 249/134 |
| 3,435,881 | 4/1969 | Smith et al. | 249/134 X |
| 4,139,677 | 2/1979 | Blair et al. | 428/409 |
| 4,391,622 | 7/1983 | Alting et al. | 65/374.11 X |
| 4,425,407 | 1/1984 | Galasso et al. | 423/345 X |
| 4,432,957 | 2/1984 | Gupta et al. | 423/345 |

FOREIGN PATENT DOCUMENTS 56-45830  4/1981  Japan ................................ 65/374.13

Primary Examiner—Robert Lindsay
Attorney, Agent, or Firm—Wenderoth, Lind & Ponack

[57] ABSTRACT

A mold used for manufacturing optical glass parts by the direct press molding of lumps of raw optical glass. The pressing surface of the mold is made of a material comprising α type SiC or amorphous SiC or a mixture of both. The pressing surface may be a coated film on a base body of hard alloy or high density carbon.

6 Claims, 2 Drawing Figures

MOLD FOR DIRECT PRESS MOLDING OF OPTICAL GLASS ELEMENT

BACKGROUND OF THE INVENTION

1. Field of the Invention

This invention relates to a mold used for the manufacturing of optical glass parts such as a lens and prism by directly pressing lumps of optical glass materials to form such optical glass parts.

2. Description of the Prior Art

In recent years, there is a tendency for the optical glass parts, especially the optical glass lenses, to have aspherical surfaces so as to simultaneously achieve the simplified construction as well as the lightweight lens of a lens system in an optical instrument. With the existing grinding method employed as a manufacturing method of the optical lens, difficulties are involved in the workability and quantity production while the direct press molding method is regarded as a promising method for manufacturing an aspherical lens.

In this direct press molding method, a pair of molds 1 and 2, e.g., as shown in FIG. 1, which is finished beforehand to the desired surface quality and surface accuracy and has aspherical pressing surfaces 3 and 4 as shown in FIG. 1 is used for molding by heating the lump of the optical glass on the mold or by pressing the lump of the preheated optical glass, without requiring any further post processes such as a grinding process after the press molding of the optical lens.

However, said manufacturing method of the optical glass lens is required to provide the produced lens with good quality to an extent that the quality of the image formed by the lens is not damaged after the press molding.

Therefore, the mold is required to have the least chemical action to the glass at high temperature, hard glass pressing surface which is not susceptible to damage such as scratches, and high breaking resistance to the thermal shock caused by repeated rapid heating and rapid cooling, among other properties.

To meet such requirements, materials such as silicon carbide and silicon nitride are said so far to be suitable for the mold, and various studies are being made.

However, many polymorphisms are present in the crystal structure of silicon carbide which is regarded as the most prospective material for the mold used for the above purposes and such polymorphisms extremely differ in their chemical and physical properties. There is a problem among others that some of such polymorphisms have violent reactions against the components of glass composition, and it cannot be simply said that silicon carbide is a suitable material for the mold by merely verifying that it is a compound of Si and C through analysis.

SUMMARY OF THE INVENTION

Because the optical glass parts, in particular the optical glass lenses of good image forming quality, are manufactured by the continuous direct press molding, the material of the direct press mold of this invention is either of the $\alpha$ type SiC or the amorphous SiC or otherwise a mixture of both, which is the characteristic of this material.

More particularly, the following three types of the mold of this invention are available. One type of the mold for the press molding of this invention consists of the sintered substance of the $\alpha$ type SiC.

The other type of the mold of this invention is the one of which improves the defect wherein it is difficult to work the simple substance of the $\alpha$ type SiC of the above into the shape of a mold. This improved mold is made from the base material of sintered hard alloy mainly consisting of tungsten carbide (WC) and cobalt (Co) and having better workability than the simple substance of SiC. The base material is worked into a mold having a shape of a lens to be molded.

This mold is further coated over its press molding surface with the film of uniform thickness of the $\alpha$ type SiC or the amorphous SiC or otherwise a mixed phase of both.

Another type of the mold of this invention is made from the base material of a block of high density carbon instead of said sintered hard alloy. In this case, however, the carbon used as the base material has extremely good workability and can be worked into any shape but is a little porous. If, however, the $\beta$ type SiC film is formed on this base material by the CVD method or PVD method, the working generally becomes more difficult than that of the simple substance of carbon whereas the $\beta$ type SiC is relatively easily worked in the silicon carbide (SiC). Therefore, if a block of high density carbon is worked into a mold of aspherical surface beforehand, a thick film of the $\beta$ type SiC is formed on the pressing surface, each pressing surface is worked further into the one with higher accuracy again, and then coated consecutively thereon with the film of uniform thickness of the $\alpha$ type SiC or the amorphous SiC or otherwise the mixed phase of both, then such mold is excellent for the direct press molding.

The reason that the film surface of the $\beta$ type SiC is not directly used for the pressing surface is because the $\beta$ type SiC reacts easily with the glass containing much alkali metal such as Na, K or Ba. Forming the film of the $\alpha$ type or amorphous SiC or the mixture of both on the pressing surface makes a mold which does not react with the glass of above.

The three types of the mold described above are characterized by the fact that the material constituting their pressing surfaces has high hardness, can stand the rapid heating and rapid cooling, and, is of the $\alpha$ type SiC or the amorphous SiC or the mixed phase of both which does not easily react with glasses of various composition.

By the direct press molding of the lump of the optical glass material using the above-mentioned types of the molds, it has become possible to manufacture the optical glass parts of highly accurate shape and good image formation quality.

DESCRIPTION OF THE PREFERRED EMBODIMENTS

The present invention will be described hereinafter in connection with the preferred embodiments.

Embodiment 1

Figure 1:
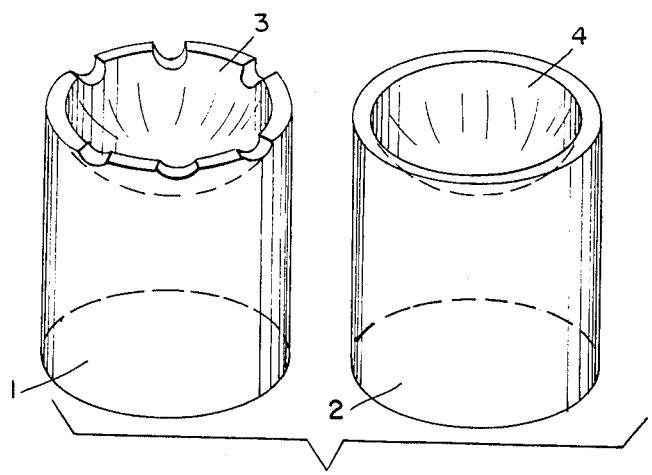
FIG. 1 is a perspective view illustrating an embodiment of this invention for the mold for the direct press molding.

FIG. 1 shows an embodiment of this invention for the mold.

Two each of the sintered α type silicon carbide cylinders of 30 mm in diameter and 50 mm long having the compositions shown in the Table 1 are prepared, one of which is worked into the top mold 1 having the concave 3 of the radius of curvature of 46 mm provided with cuts on its periphery as shown in FIG. 1 while the other is worked into the bottom mold 2 having the concave 4 of the radius of curvature of 200 mm so as to make a pair of molds for press molding.

Press molding surfaces of each pair of these blocks are mirror polished with superfine abrasive grains of diamond and finished to the maximum surface roughness of less than 0.02 μm. The pair of molds 1 and 2 made in such manner is set in the press machine shown in FIG. 2 and the spherical optical glass lump 11 of 20 mm radius constituted by one of the two kinds of compositions stated below is pressed to mold into a biconvex lens in the atmosphere of argon gas containing 2% of hydrogen. The press machine is constructed to have the piston cylinders 7 and 8 arranged with the heaters 5 and 6 so that the pair of molds 1 and 2 can be installed and heated in a vessel which can be closed tightly to control the atmosphere. The raw glass lump 11 is clamped and held by the raw glass feeding fixture 10, passed through the glass preheating tunnel kiln 9 and inserted inside the press machine.

The raw glass lump 11 is put on the bottom mold 2 to be further heated and pressed by moving the pair of molds 1 and 2 by means of the piston cylinders 7 and 8. The molded glass after pressing is taken out from the discharging opening 12. One of the two kinds of the optical glass which are press molded is an optical glass of borosilicate alkali system consisting of 68 wt % of $SiO_2$, 11 wt % of $B_2O_3$, 10 wt % of $Na_2O$, 8 wt % of $K_2O$, and the very small quantity of composition in the balance, while the other is an optical glass of borosilicate barium system consisting of 31 wt % of $SiO_2$, 17 wt % of $B_2O_3$, 50 wt% of BaO and the very small quantity of composition in the balance.

For the press molding of the glass lump, the molds are heated to 800° C., the glass lump is pressed under a press pressure of 40 kg.cm$^{-2}$, allowed to cool down to 400° C. in the pressed condition, and the molded glass and molds are taken out together. Table 2 shows the results of the press molding of the glass of borosilicate alkali system of the above and Table 3 the results of the press molding of the glass of borosilicate barium system respectively.

Figure 2:
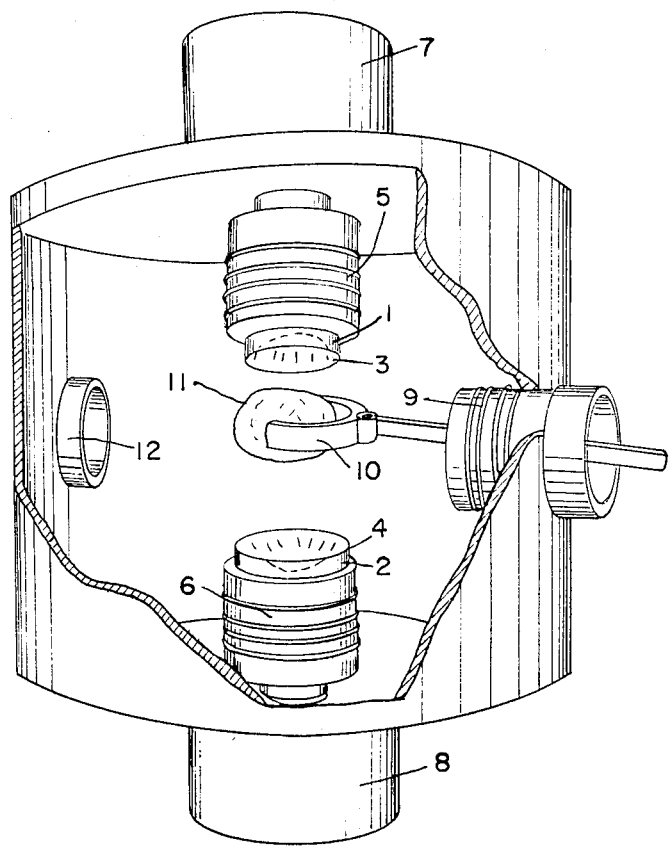
FIG. 2 is a cross-sectional perspective view illustrating an important part of a press machine for the press molding employed in an embodiment of this invention.

For comparison, a mold of the β type SiC which is another type of the silicon carbide is manufactured, set in the press machine in FIG. 2 in the place of the mold of this invention, and the similar optical glass lump to the above-mentioned was press molded under the similar conditions. The results of this press molding are also shown in Table 2 and Table 3.

The mold of this β type silicon carbide was finished to the shape of the press mold of the α type silicon carbide (specimen No. 1 of Table 1), however, the crystal structure of 3 C of 200 μm thick, i.e., the film of the β type silicon carbide is formed by the CVD method on the surface contacting the glass lump during the press molding, and this surface was mirror polished with abrasive grains of diamond up to the maximum surface roughness of 0.02 μm.

The mold of the β type silicon carbide reacted with the glass during the press molding and was found unsuitable as the mold material.

As can be seen from Table 2 and Table 3, the press mold of the preferred embodiment of this invention excels extremely in the press moldability of the optical glass as compared with the mold of the β type silicon carbide which has the same chemical composition but differ considerably in the crystal structure.

TABLE 1

| No. | Types | \multicolumn{5}{c}{Ratio of composition} |
|-----|-------|----|----|----|----|----|
|     |       | 2H | 4H | 6H | 15R | 33R |
| 1 | Specimen 1 | — | Very small quantity | 98 | Very small quantity | — |
| 2 | Specimen 2 | — | 98 | Very small quantity | Very small quantity | Very small quantity |
| 3 | Specimen 3 | 98 | Very small quantity | — | — | — |

TABLE 2

Press Moldability of Borosilicate Glass

| No. | Types of mold | | Condition of the glass after pressing | | Deteriorating condition of the pressing surface of mold (after 20 continous pressing) | Separation of the mold and glass |
|-----|---------------|---|-----------|------------|-----------|-----------|
|     |               |   | Transparency | Smoothness of the pressing surface of mold | | |
| 1 | α type SiC | Specimen 1 | o | o | o | o |
| 2 |            | 2 | o | o | o | o |
| 3 |            | 3 | o | o | o | o |
| 4 | β type SiC |   | x | x | x | x |

Circles (o) denote "good".

TABLE 3

Press Moldability of Borosilicate Barium Glass

| No. | Types of mold | | Condition of the glass after pressing | | Deteriorating condition of the pressing surface of mold (after 20 continuous pressing) | Separation of the mold and glass |
|---|---|---|---|---|---|---|
| | | | Transparency | Smoothness of the pressing surface of mold | | |
| 1 | α type SiC | Specimen 1 | o | o | o | o |
| 2 | | 2 | o | o | o | o |
| 3 | | 3 | o | o | o | o |
| 4 | β type SiC | | x | x | x | x |

Circles (o) denote "good."

As described above, because the mold for the direct press molding of the optical glass parts stated in the present invention employs the silicon carbide material which is indicated as the α type SiC, in case the glass lump for the optical glass part is press molded, no chemical reaction occurs on the contacting surfaces of the mold and the glass nor is the transparency of the glass surface lost after molding, and further the excellent effect of good separation of the glass and mold during the molding is obtained. Using this material for the mold therefore makes the direct press molding method of considerable productivity feasible as compared with the past method in connection with the manufacturing of the optical glass parts.

Embodiment 2

Two each of the hard alloy cylinders of 30 mm in diameter and 50 mm long containing 2 wt% of Co and the balance having WC of average grain diameter of 0.5 μm are prepared. One of the two cylinders was machined by electric discharging to make the top mold of similar shape shown in FIG. 1 of the embodiment 1 having a concave of radius of curvature of 46 mm and cuts on the periphery thereof, while the other cylinder was machined in similar manner to make the bottom mold having a concave of radius of curvature of 200 mm so as to provide a pair of molds for press molding. As the result of the mirror polishing of the press molding surfaces of each pair of these blocks with superfine abrasive grains of diamond, the such surfaces were mirror polished to the maximum surface roughness of 0.02 μm inside of two hours. Then, the 2 μm thick film of the amorphous silicon carbide (SiC) was formed on such mirror polished surface by sputtering so as to make the mold for press molding of the glass.

The molds made in such manner are set in the press machine of similar construction as shown in FIG. 2 of the embodiment 1 and the two kinds of spherical optical glass lumps of 20 mm radius are pressed to mold into biconvex lenses.

One of such spherical optical glass lumps which are press molded is an optical glass of borosilicate alkali system consisting of 68 wt% of $SiO_2$, 11 wt% of $B_2O_3$, 10 wt% of $Na_2O$, 8 wt% of $K_2O$, and the very small quantity of composition in the balance, while the other is an optical glass of borosilicate barium system consisting of 31 wt% of $SiO_2$, 17 wt% of $B_2O_3$, 50 wt% of BaO, and the very small quantity of composition in the balance.

For the press molding of such glass lumps, the molds are heated to 800° C., the glass lumps pressed under a press pressure of 40 kg/cm$^2$, allowed to cool down to 400° C. in the pressed conditions, and the molded glass and molds are taken out together. The specimen No. 1 in Table 4 shows the results of the press molding of the glass of borosilicate alkali system of the above and the specimen No. 2 of Table 5 the results of the press molding of the glass of borosilicate barium system respectively.

For the purpose of comparison, molds of the simple substance of the silicon carbide (SiC) and the simple substance of the silicon nitride ($Si_3N_4$) which were used in the past are manufactured, set in the similar press machine as stated above in the place of the molds of the preferred embodiments of this invention, and the glass lump of similar composition as stated above was pressed under the similar conditions.

These molds of the silicon carbide and the silicon nitride are finish ground to the similar shape to the sintered hard alloy mold after electric discharging and mirror polished of its surface using the similar abrasive grains of diamond as stated above. For this mirror polishing process alone, it took 40 to 50 hours to finish both molds to the maximum surface roughness of up to 0.02 μm. The time required is 20 to 25 times as compared with the grinding of the sintered hard alloy molds. Results of press molding by these two molds are shown in Table 4 (specimen No. 11 and No. 12) and Table 5 (specimen No. 11 and No. 12) as examples for comparison.

As is apparent from Table 4 and Table 5, the press molds of the specimen No. 1 through 6 of the preferred embodiments of this invention are better than the silicon carbide molds used conventionally and can be manufactured easily. It is also apparent from the Tables that these molds demonstrate excellent performance over the conventional molds especially when the quantity of Co is in a range of 2–20 wt% and the grain diameter of WC in the range of 0.05 μm–0.5 μm.

TABLE 4

Results of Press Molding of Borosilicate Alkali Glass

| Specimen No. | Q'ty of Co (wt %) | Grain diameter of WC (μm) | Max. surface roughness of mold: Rmax. (μm) | Coating method | Type of coated film | Glass surface condition after pressing | Mold surface condition after 100 pressing |
|---|---|---|---|---|---|---|---|
| 1 | 2 | 0.05 | 0.013 | Sput- | Amor- | Good | Good |

TABLE 4-continued

Results of Press Molding of Borosilicate Alkali Glass

| Specimen No. | Q'ty of Co (wt %) | Grain diameter of WC (μm) | Max. surface roughness of mold: Rmax. (μm) | Coating method | Type of coated film | Glass surface condition after pressing | Mold surface condition after 100 pressing |
|---|---|---|---|---|---|---|---|
| | | | | tering | phous | | |
| 2 | 5 | 0.10 | 0.015 | Sputtering | Amorphous | Good | Good |
| 3 | 15 | 0.25 | 0.017 | Sputtering | Amorphous | Good | Good |
| 4 | 20 | 0.50 | 0.02 | Sputtering | Amorphous | Good | Good |
| 5 | 5 | 0.10 | 0.019 | CVD** | α | Good | Good |
| 6 | 5 | 0.10 | 0.015 | CVD | Amorphous | Good | Good |
| 7* | 5 | 0.10 | 0.015 | CVD | β | Discolored | Reacted with glass. |
| 8* | 1 | 0.10 | 0.05 | Sputtering | Amorphous | No good | Glass attached to mold. |
| 9* | 25 | 0.10 | 0.016 | Sputtering | Amorphous | Good | Filmed peeled off. |
| 10* | 5 | 0.6 | 0.08 | Sputtering | Amorphous | No good | Glass attached to mold. |
| 11* | Sintered SiC mold | | 0.02 | N.A. | α + β | No good | Reacted with glass. |
| 12* | Sintered $Si_3N_4$ mold | | 0.02 | N.A. | α + β | No good | Reacted with glass. |

*Specimen No. 7~No. 12 are examples of comparison.
**Chemical Vapor Depostion

TABLE 5

Results of Press Molding of Borosilicate Barium Glass

| Specimen No. | Q'ty of Co (wt %) | Grain diameter of WC (μm) | Max. surface roughness of mold: Rmax. (μm) | Coating method | Type of coated film | Glass surface condition after pressing | Mold surface condition after 100 pressing |
|---|---|---|---|---|---|---|---|
| 1 | 2 | 0.05 | 0.013 | Sputtering | Amorphous | Good | Good |
| 2 | 5 | 0.10 | 0.015 | Sputtering | Amorphous | Good | Good |
| 3 | 15 | 0.25 | 0.017 | Sputtering | Amorphous | Good | Good |
| 4 | 20 | 0.50 | 0.02 | Sputtering | Amorphous | Good | Good |
| 5 | 5 | 0.10 | 0.019 | CVD** | α | Good | Good |
| 6 | 5 | 0.10 | 0.019 | CVD | Amorphous | Good | Good |
| 7* | 5 | 0.10 | 0.019 | CVD | β | No good (Glass became slightly opaque.) | Glass attached to mold. |
| 8* | 1 | 0.10 | 0.05 | Sputtering | Amorphous | No good (Glass became slightly opaque.) | Glass attached to mold. |
| 9* | 25 | 0.10 | 0.016 | Sputtering | Amorphous | Good | Sputtered film peeled. |
| 10* | 5 | 0.6 | 0.08 | Sputtering | Amorphous | No good (Glass became slightly opaque.) | Glass attached to mold. |
| 11* | Sintered SiC mold | | 0.02 | N.A. | α + β | No good (Glass became slightly opaque.) | Glass attached to mold. |
| 12* | Sintered $Si_3N_4$ mold | | 0.02 | N.A. | α + β | No good (Glass became slightly | Glass attached to mold. |

TABLE 5-continued

| Specimen No. | Q'ty of Co (wt %) | Grain diameter of WC (μm) | Max. surface roughness of mold: Rmax. (μm) | Coating method | Type of coated film | Glass surface condition after pressing | Mold surface condition after 100 pressing |
|---|---|---|---|---|---|---|---|
| | | | | | | opaque.) | |

*Specimen No. 7~No. 12 are examples of comparison.
**Chemical Vapor Deposition

Embodiment 3

Two each of the cylinders of high carbon density of 30 mm in diameter and 50 mm long are prepared, one of which is worked into the top mold of similar shape shown in FIG. 1 of the embodiment 1 having a concave of radius of curvature of 46.1 mm and cuts on the periphery thereof, while the other cylinder is worked into the bottom mold having a concave of radius of curvature of 200.1 mm so as to provide a pair of molds for press molding.

Then, these molds are put into a furnace heated to 1400° C. flowing a gas mixture of silicon tetrachloride (SiCl$_4$), ethylene (C$_2$H$_2$) and hydrogen (H$_2$), and the β-SiC films of 0.2 mm thick are formed on the concave surfaces of respective molds. The concave of the top mold is then machined to a radius of curvature of 46.0 mm and that of the bottom mold to a radius of curvature of 200.0 mm. The top and bottom molds are polished for four hours using superfine abrasive grains of diamond until the maximum surface roughness of 0.02 μm is obtained.

Furthermore, the amorphous SiC films of 2 μm thick are formed by sputtering on these mirror polished surfaces to make molds for press molding of glass.

The molds made in such manner are set in the press machine of similar construction as shown in FIG. 2 of the embodiment 1 and the two kinds of spherical optical glass lumps of 20 mm radius are pressed to mold into biconvex lenses.

One of such spherical optical glass lumps which are press molded is an optical glass of borosilicate alkali system consisting of 68 wt% of SiO$_2$, 11 wt% of B$_2$O$_3$, 10 wt% of Na$_2$O, 8 wt% of K$_2$O, and the very small quantity of composition in the balance, while the other is an optical glass of borosilicate barium system consisting of 31 wt% of SiO$_2$, 17 wt% of B$_2$O$_3$, 50 wt% of BaO, and the very small quantity of composition in the balance.

The molds are then heated to 800° C., the glass lumps pressed under a press pressure of 40 kg/cm$^2$, allowed to cool down to 400° C. in the pressed conditions, and the molded glass and molds are taken out together. The specimen No. 1 in Table 6 shows the results of the press molding of the borosilicate alkali glass and the specimen No. 1 in Table 7 the results of the press molding of the borosilicate barium glass respectively.

For the purpose of comparison, molds of the simple substance of the silicon carbide (SiC) and the simple substance of the silicon nitride (Si$_3$N$_4$) which were used in the past are manufactured, set in the similar press machine as stated above in the place of the molds of this invention, and the glass lump of similar composition as stated above was pressed under the similar conditions.

These molds of the silicon carbide and the silicon nitride are rough ground and then mirror polished of its surfaces with the similar abrasive grains of diamond as stated above.

For this mirror polishing process alone, it took 40 to 50 hours, which is 10 to 15 times of the time required to finish the β-SiC surface on the cylinder of high density carbon up to 0.02 μm. Results of press molding by the silicon carbide mold are shown in Table 6 (specimen No. 11 and No. 12) and in Table 7 (specimen No. 11 and No. 12) as examples of comparison.

As is apparent from Table 6 and Table 7, respective press molds of the specimen No. 1 through No. 8 of the preferred embodiments of this invention tested under various conditions are better than the molds of silicon carbide and silicon nitride used conventionally and can be manufactured easily. Specimen No. 9 through 12 in Table 6 and Table 7 are mentioned for comparison and outside of the scope of the present invention.

TABLE 6

| | Press Moldability of Borosilicate Alkali Glass | | | | | | |
|---|---|---|---|---|---|---|---|
| | Method of coating | Type of film | Time needed to finish mold to max. | Film coated on mirror polished β-SiC | | Glass surface condi- | Mold surface |
| Specimen No. | β-SiC on carbon | coated on carbon | surface roughness of 0.02 μm | Coating method | Type of film | tion after pressing | condition after 100 pressing |
| 1 | CVD | β-SiC | 4 hours | Sputtering | Amorphous | Good | Good |
| 2 | CVD | β-SiC | 4 hours | CVD | Amorphous | Good | Good |
| 3 | CVD | β-SiC | 4 hours | CVD | α-SiC | Good | Good |
| 4 | CVD | β-SiC | 4 hours | Sputtering | α-SiC | Good | Good |
| 5 | Sputtering | β-SiC | 4 hours | Sputtering | Amorphous | Good | Good |
| 6 | Sputtering | β-SiC | 4 hours | Sputtering | α-SiC | Good | Good |
| 7 | Sputtering | β-SiC | 4 hours | CVD | Amorphous | Good | Good |
| 8 | Sput- | β-SiC | 4 hours | CVD | α-SiC | Good | Good |

TABLE 6-continued

| | Press Moldability of Borosilicate Alkali Glass | | | | | |
|---|---|---|---|---|---|---|
| Specimen No. | Method of coating β-SiC on carbon | Type of film coated on carbon | Time needed to finish mold to max. surface roughness of 0.02 μm | Film coated on mirror polished β-SiC | | Mold surface condition after 100 pressing |
| | | | | Coating method | Type of film | Glass surface condition after pressing | |
| 9* | tering CVD | α-SiC | 45 hours | CVD | α-SiC | Good | Good |
| 10* | CVD | β-SiC | 4 hours | CVD | β-SiC | Glass became slightly opaque. | Glass attached to mold. |
| 11* | Sintered SiC mold | | 50 hours | N.A. | N.A. | Glass became slightly opaque. | Glass reacted with mold. |
| 12* | Sintered Si₃N₄ mold | | 45 hours | N.A. | N.A. | Glass became slightly opaque. | Glass reacted with mold. |

*Specimen No. 9~No. 12 are examples of comparison.

TABLE 7

| | Press Moldability of Borosilicate Barium Glass | | | | | |
|---|---|---|---|---|---|---|
| Specimen No. | Method of coating β-SiC on carbon | Type of film coated on carbon | Time needed to finish mold to max. surface roughness of 0.02 μm | Film coated on mirror polished β-SiC | | Mold surface condition after 100 pressing |
| | | | | Coating method | Type of film | Glass surface condition after pressing | |
| 1 | CVD | β-SiC | 4 hours | Sputtering | Amorphous | Good | Good |
| 2 | CVD | β-SiC | 4 hours | CVD | Amorphous | Good | Good |
| 3 | CVD | β-SiC | 4 hours | CVD | α-SiC | Good | Good |
| 4 | CVD | α-SiC | 4 hours | Sputtering | α-SiC | Good | Good |
| 5 | Sputtering | β-SiC | 4 hours | Sputtering | Amorphous | Good | Good |
| 6 | Sputtering | β-SiC | 4 hours | Sputtering | α-SiC | Good | Good |
| 7 | Sputtering | β-SiC | 4 hours | CVD | Amorphous | Good | Good |
| 8 | Sputtering | β-SiC | 4 hours | CVD | α-SiC | Good | Good |
| 9* | CVD | α-SiC | 45 hours | CVD | α-SiC | Good | Good |
| 10* | CVD | β-SiC | 4 hours | CVD | β-SiC | Glass became slightly opaque. | Glass reacted with mold. |
| 11* | Sintered SiC mold | | 50 hours | N.A. | N.A. | Glass became slightly opaque. | Glass reacted with mold. |
| 12* | Sintered Si₃N₄ mold | | 45 hours | N.A. | N.A. | Glass became slightly opaque. | Glass reacted with mold. |

*Specimen No. 9~No. 12 are examples of comparison.

Various changes and modifications can be made in the described structure without departing from the scope of the invention defined in the appended claims.

What is claimed is:

1. A mold used for manufacturing optical glass parts by direct press molding of lumps of raw optical glass, characterized in that a pressing surface of said mold is made of a material comprising at least one of α type silicon carbide and amorphous silicon carbide.

2. A mold used for manufacturing optical glass parts by direct press molding of lumps of raw optical glass, comprising a sintered body of α type silicon carbide.

3. A mold used for manufacturing optical glass parts by direct press molding of lumps of raw optical glass, comprising:
a base body of hard alloy having a surface in the form of a surface of an optical glass to be molded; and
a film coated on said surface of said base body with a uniform thickness, said coated film comprising at least one of α type silicon carbide and amorphous silicon carbide.

4. The mold according to claim 3, wherein said hard alloy is mainly composed of 98-80 weight % of tungsten carbide and 2-20 weight % of cobalt.

5. The mold according to claim 4, wherein the grain size of said tungsten carbide is 0.05–0.5 μm.

6. A mold used for manufacturing optical glass parts by direct press molding of lumps of raw optical glass, comprising:
   a base body of carbon;
   a body of β type silicon carbide deposited on said base body and having a surface in the form of a surface of a glass part to be molded; and
   a film coated on said surface of said β type silicon carbide body with a uniform thickness, said coated film comprising at least one of α type silicon carbide and amorphous silicon carbide.

* * * * *